(12) United States Patent
Watanabe et al.

(10) Patent No.: US 11,453,246 B2
(45) Date of Patent: Sep. 27, 2022

(54) TIRE

(71) Applicant: BRIDGESTONE CORPORATION, Tokyo (JP)

(72) Inventors: Atsushi Watanabe, Tokyo (JP); Ataka Takei, Tokyo (JP); Shoko Nagamoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 323 days.

(21) Appl. No.: 16/756,125

(22) PCT Filed: Sep. 7, 2018

(86) PCT No.: PCT/JP2018/033253
§ 371 (c)(1),
(2) Date: Apr. 15, 2020

(87) PCT Pub. No.: WO2019/077905
PCT Pub. Date: Apr. 25, 2019

(65) Prior Publication Data
US 2020/0238767 A1    Jul. 30, 2020

(30) Foreign Application Priority Data

Oct. 16, 2017    (JP) .............................. JP2017-200582

(51) Int. Cl.
 B60C 11/03    (2006.01)
(52) U.S. Cl.
 CPC ...... B60C 11/0306 (2013.01); B60C 11/0304 (2013.01); *B60C 2011/0346* (2013.01);
(Continued)
(58) Field of Classification Search
 None
 See application file for complete search history.

(56) References Cited

U.S. PATENT DOCUMENTS

2008/0047641 A1    2/2008    Takahashi
2008/0053584 A1    3/2008    Ohara
(Continued)

FOREIGN PATENT DOCUMENTS

CN    1907738 A    2/2007
CN    101134425 A    3/2008
(Continued)

OTHER PUBLICATIONS

He Jian-qing et al., "Design of 395/85R20 14PR Tubeless Truck and Bus Radial Tire", Tire Industry, 2012, (09): 17-21.
(Continued)

*Primary Examiner* — Yung-Sheng M Tsui
(74) *Attorney, Agent, or Firm* — Solaris Intellectual Property Group, PLLC (57) ABSTRACT

In a tire, plural outer side cutouts, which respectively correspond to block land portions and extend toward tire width direction outer sides and end midway along outer side land portions, are formed so as to be spaced apart in a tire circumferential direction in tire width direction inner-side side walls, which are exposed to central circumferential grooves, of the outer side land portions that are provided further toward tire width direction outer sides than the two central circumferential grooves respectively. Further, at least portions of tire width direction inner side openings of the outer side cutouts are positioned between maximum position A, at which a tire width direction distance of a corresponding block land portion is a maximum, and an intermediate point B of two vertices that are adjacent at a tire width direction outer-side side wall of the block land portion.

8 Claims, 3 Drawing Sheets

(52) U.S. Cl.
CPC ............... *B60C 2011/0348* (2013.01); *B60C 2011/0358* (2013.01)

(56) References Cited

U.S. PATENT DOCUMENTS

| | | | |
|---|---|---|---|
| 2008/0053585 A1 | 3/2008 | Ohara | |
| 2010/0180997 A1 | 7/2010 | Shimizu | |
| 2011/0139324 A1 | 6/2011 | Kuwahara et al. | |
| 2012/0273105 A1 | 11/2012 | Ducci et al. | |
| 2014/0230979 A1 | 8/2014 | Matsuda | |
| 2014/0230983 A1 | 8/2014 | Tagashira et al. | |
| 2014/0238568 A1 | 8/2014 | Haga | |
| 2014/0360639 A1 | 12/2014 | Fujioka | |
| 2015/0298508 A1 | 10/2015 | Yamakawa et al. | |
| 2016/0193881 A1 | 7/2016 | Nakayama | |
| 2017/0008349 A1 | 1/2017 | Tanaka | |
| 2018/0001708 A1* | 1/2018 | Fujioka | B60C 11/0306 |

FOREIGN PATENT DOCUMENTS

| | | | | |
|---|---|---|---|---|
| CN | 102196927 A | | 9/2011 | |
| CN | 102596594 A | | 7/2012 | |
| CN | 106335324 A | | 1/2017 | |
| CN | 107031304 A | | 8/2017 | |
| DE | 102015221257 A1 | | 5/2017 | |
| JP | S62-120203 A | | 6/1987 | |
| JP | S62-251204 A | | 11/1987 | |
| JP | H09-66710 A | | 3/1997 | |
| JP | H11-245630 A | | 9/1999 | |
| JP | 2000-025420 A | | 1/2000 | |
| JP | 2000-177330 A | | 6/2000 | |
| JP | 2000-219015 A | | 8/2000 | |
| JP | 2001-191739 A | | 7/2001 | |
| JP | 2005-271792 A | | 10/2005 | |
| JP | 2006-335232 A | | 12/2006 | |
| JP | 2006335232 A | * | 12/2006 | ......... B60C 11/1263 |
| JP | 2007-099110 A | | 4/2007 | |
| JP | 2008-49791 A | | 3/2008 | |
| JP | 2008-056110 A | | 3/2008 | |
| JP | 2008-056111 A | | 3/2008 | |
| JP | 2008049791 A | * | 3/2008 | ......... B60C 11/0309 |
| JP | 2008-162298 A | | 7/2008 | |
| JP | 2010-047140 A | | 3/2010 | |
| JP | 2010047140 A | * | 3/2010 | |
| JP | 2011-183926 A | | 9/2011 | |
| JP | 2012-051484 A | | 3/2012 | |
| JP | 2013-244907 A | | 12/2013 | |
| JP | 2014-177262 A | | 9/2014 | |
| JP | 2014-240204 A | | 12/2014 | |
| JP | 2015-016852 A | | 1/2015 | |
| JP | 2015016852 A | * | 1/2015 | ......... B60C 11/0306 |
| JP | 2015-063183 A | | 4/2015 | |
| JP | 2016-016713 A | | 2/2016 | |
| WO | 2008/146851 A1 | | 12/2008 | |
| WO | 2009/084666 A1 | | 7/2009 | |
| WO | WO-2009084666 A1 | * | 7/2009 | ......... B60C 11/0309 |
| WO | 2013/051053 A1 | | 4/2013 | |

OTHER PUBLICATIONS

Search Report of the notification to grant patent right dated Mar. 18, 2022, from the SIPO in a Chinese patent application No. 2018800666413 corresponding to the instant patent application.

Search Report of the Chinese office action dated Jul. 14, 2021, from the SIPO in a Chinese patent application No. 2018800666413 corresponding to the instant patent application.

International Search Report issued in International Application No. PCT/JP2018/033253 dated Oct. 23, 2018.

Guo Bibao, "Car Recognition", Shanghai Jiaotong University Press, Sep. 2015, 1st Edition, pp. 115-123.

English language translation of the following: Office action dated Dec. 31, 2021 from the SIPO in a Chinese patent application No. 201880066641.3 corresponding to the instant patent application. This office action translation is submitted now in order to supplement the understanding of the cited reference which is being disclosed in the instant Information Disclosure Statement.

* cited by examiner

TIRE

TECHNICAL FIELD

The present disclosure relates to a tire in which two block land portion rows, which are formed from numerous block land portions, are disposed at the central portion of the tread.

BACKGROUND ART

Structures such as that disclosed in Japanese Patent Application Laid-Open (JP-A) No. 2010-047140 for example are known as conventional tires.

Such a structure is a tire in which plural block land portion rows that are formed from numerous block land portions are sectioned and formed due to plural circumferential direction grooves, which extend in the tire circumferential direction, and plural lateral grooves, which communicate two adjacent circumferential direction grooves, being disposed at the tread portion. In at least two block land portion rows that are adjacent to one another with a circumferential direction groove therebetween, the block land portions that structure these are disposed so as to be offset from one another in the tire circumferential direction. The directions of extending of groove portions that are between block land portions that are adjacent in the tire width direction, are inclined with respect to the tire width direction and the tire circumferential direction. The distance between block land portions that are adjacent in the tire width direction is shorter than the distance between block land portions that are adjacent in the tire circumferential direction. The tire width direction cross-sectional length of the block land portion is at least partially enlarged from both the tire circumferential direction end portions of the block land portion toward the central portion of the block land portion. Due thereto, traction on wet road surfaces is improved while the wear resistance is maintained.

SUMMARY OF INVENTION

Technical Problem

Here, in geographical regions where there is some accumulation of snow several times a year, there has been the demand in recent years for so-called normal tires that have good on-snow performance and that, even if snow falls, enable comfortable traveling on normal tires without having to replace them with studless tires. Thus, the present inventors repeatedly carried out earnest research into the behavior of tire treads on accumulated snow, and discovered a mechanism that can easily improve the on-snow performance without leading to a deterioration of the other properties of the tire.

The present disclosure is based on the above-described knowledge, and an object thereof is to provide a tire that enables easy improvement of the on-snow performance.

Solution to Problem

This object can be achieved by a tire in which, by forming a central narrow groove, which is formed in a tread central portion and extends in a tire circumferential direction while having a zigzag shape, and two central circumferential grooves, which are respectively formed at both tire width direction outer sides of the central narrow groove and extend in the tire circumferential direction and have widths that are wider than the central narrow groove, and a plurality of lateral grooves, which communicate the central narrow groove with the central circumferential grooves and extend in a tire width direction and are spaced apart in the tire circumferential direction, two block land portion rows are sectioned and formed between the central narrow groove and the central circumferential grooves respectively, and each of the block land portion rows is structured from numerous pentagonal or hexagonal block land portions having tire circumferential direction side walls that are side walls of the lateral grooves, wherein a plurality of outer side cutouts, which respectively correspond to the block land portions and extend toward tire width direction outer sides and end midway along outer side land portions, are formed so as to be spaced apart in the tire circumferential direction in tire width direction inner-side side walls, which are exposed to the central circumferential grooves, of the outer side land portions that are provided further toward tire width direction outer sides than the two central circumferential grooves respectively, and at least portions of tire width direction inner side openings of the outer side cutouts are positioned between maximum position A, at which a tire width direction distance of a corresponding block land portion is a maximum, and an intermediate point B of two vertices that are adjacent at a tire width direction outer-side side wall of the block land portion.

Advantageous Effects of Invention

When the above-described tire travels on a road surface that is covered with accumulated snow, snow is pushed into the central circumferential grooves of the tire. At this time, within the ground-contact region, the respective block land portions deform so as to expand in all directions including toward the tire width direction outer sides (the outer side land portions). Therefore, the snow, which has been pushed into the central circumferential grooves, is pushed out toward the outer side land portions due to the expansion deformation of the block land portions. Here, if effects of the vertex at the tire width direction outer side portion of the block land portion are ignored, the amount of expansion deformation, toward the tire width direction outer side, of the block land portion is a maximum at maximum position A at which the tire width direction distance of the block land portion (the block width) is a maximum. However, as described above, each block land portion is pentagonal or hexagonal, and the side walls of the lateral grooves structure the tire circumferential direction side walls of the block land portions. Therefore, the tire width direction distance of the block land portion (the block width) decreases continuously from the maximum position A toward the tire circumferential direction both ends. On the other hand, the amount of expansion deformation, toward the tire width direction outer sides, of the block land portion in a case in which the effects of the tire width direction distance of the block land portion (the block width) are ignored, is substantially zero at the two adjacent vertices that are at the tire width direction outer side portion of the block land portion. On the other hand, the amount of expansion deformation increases while moving away from these vertices in the tire circumferential direction, and is a maximum at intermediate point B of these two adjacent vertices.

Further, the amount of expansion deformation of the block land portion toward the tire width direction outer side is the combined amount of the above-described two types of expansion deformation amounts. However, these two types of expansion deformation amounts gradually decrease while moving away from the maximum position A and the intermediate point B, as described above. Therefore, the combined amount between the maximum position A and the intermediate point B is greater than the combined amount at further toward both the tire circumferential direction sides than the maximum position A and the intermediate point B. Therefore, in the present disclosure, the plural outer side cutouts, which extend toward the tire width direction outer side and which end midway along the outer side land portions, are formed at the tire width direction inner-side side walls of the outer side land portions, and at least portions of the tire width direction inner side openings of these outer side cutouts are positioned between the maximum positions A and the intermediate points B. Due thereto, the snow, which has been pushed into the central circumferential grooves, is reliably pushed into the outer side cutouts by the expansion deformation of the block land portions, and the density of the snow is increased, and columns of snow (snow columns) that are packed into these outer side cutouts are formed. Further, these snow columns are sheared at the time when the outer side cutouts leave the ground-contact region (at the time of kick-out), but the shearing resistance at this time acts on the tire as a large gripping force, and the on-snow performance of the tire can easily be improved.

DESCRIPTION OF EMBODIMENTS

Figure 1:
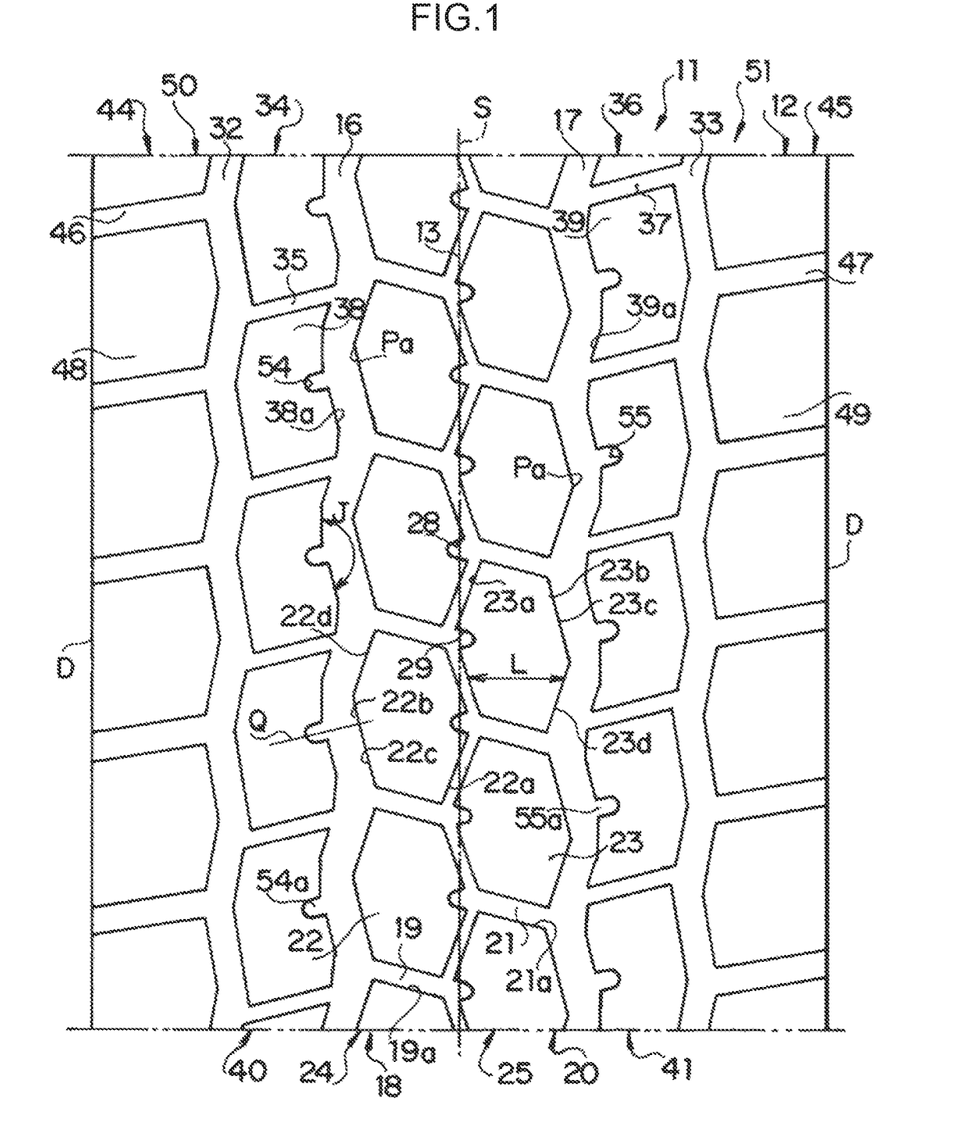
FIG. 1 is a plan view of a tire tread that illustrates embodiment 1 of the invention.
Figure 2:
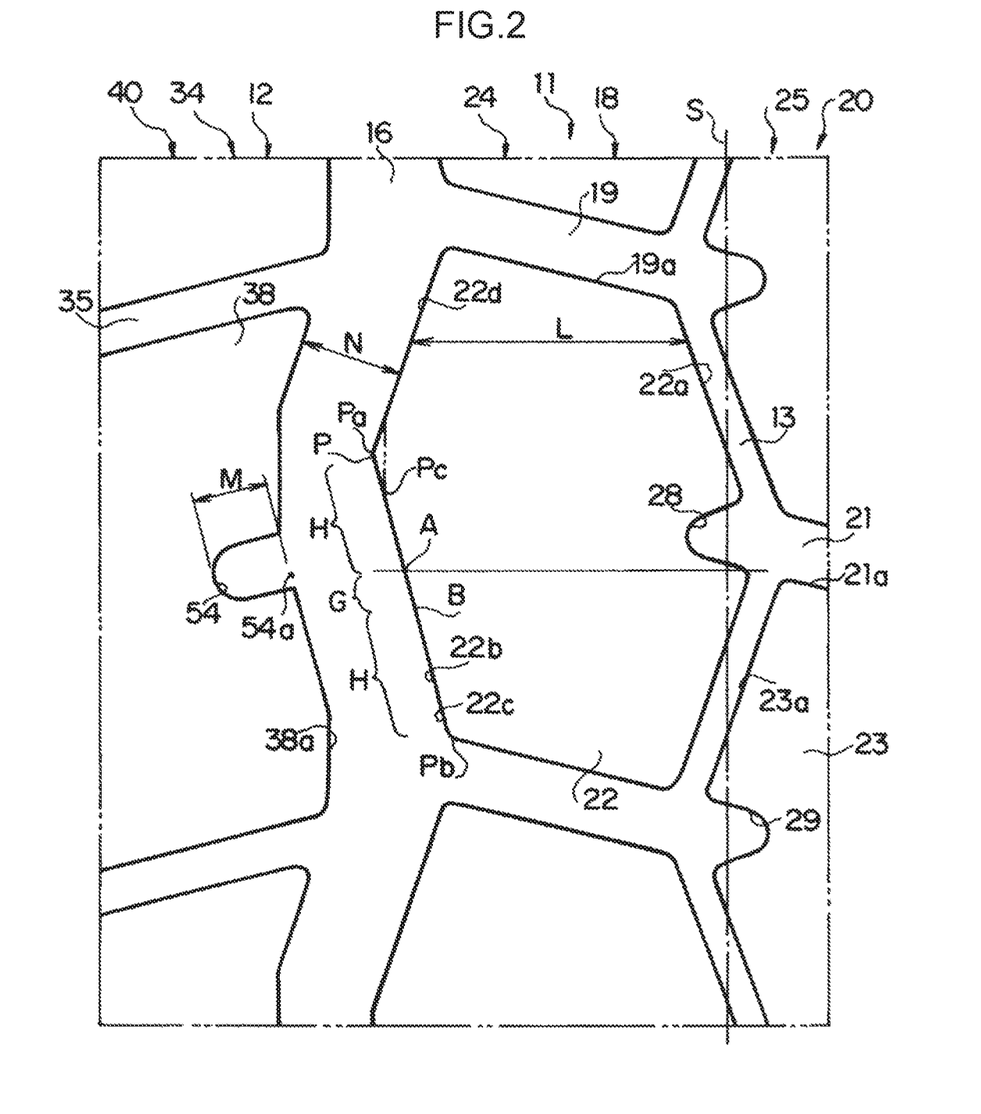
FIG. 2 is a partial, enlarged plan view of FIG. 1.

Embodiment 1 of the invention is described hereinafter on the basis of the drawings. In FIGS. 1 and 2, 11 is a normal pneumatic tire that is mounted to a passenger vehicle, a truck/bus or the like. This tire 11 has a tread 12 that is formed from a vulcanized rubber and contacts the road surface at the radial direction outer end thereof. A central narrow groove 13, which extends continuously along tire equator S without interruption in the tire circumferential direction, is formed in the tread central portion which includes the tire equator S of the tread 12. This central narrow groove 13 is bent in a zigzag shape (a triangular wave shape) whose amplitude from the tire equator S is the same. Further, due to block land portions, which are described later and are positioned at both sides of this central narrow groove 13 collapsing-deforming due to the load applied at the time of ground contact when the central narrow groove 13 intrudes into the ground-contact region, the side walls thereof (the inner-side side walls in the tire axial direction of the central narrow groove 13) contact one another. Due thereto, the force of collapsing-deforming the block land portions that are adjacent in the tire width direction is transmitted effectively. Here, in order to cause collapsing deformation such as described above at the block land portions, the groove width of the central narrow groove 13 is preferably set within a range of 1.0 to 5.0 mm, and is more preferably set within a range of 1.5 to 3.5 mm.

Two central circumferential grooves 16, 17, which serve as main grooves and extend continuously along the tire equator S without interruption in the tire circumferential direction, are respectively formed and located at positions that are equidistant from the tire equator S at both the tire width direction outer sides (the both tread end D sides) of the central narrow groove 13. These two central circumferential grooves 16, 17 are bent in zigzag shapes (triangular wave shapes) of the same wavelengths as the central narrow groove 13. From the standpoint of suppressing a deterioration in the wear resistance and the on-snow performance, the groove widths of these central circumferential grooves 16, 17 are made to be wider than the groove width of the central narrow groove 13, and are preferably set to within a range of 3.0 to 10.0 mm, and more preferably set within a range of 4.0 to 8.0 mm. These central circumferential grooves 16, 17 and the central narrow groove 13 may be disposed so as to be offset by about ⅓ of a pitch in the tire circumferential direction. Plural lateral grooves 19 that extend in the tire width direction are formed in a central land portion 18 that is demarcated between the central narrow groove 13 and the central circumferential groove 16 and that extends in the tire circumferential direction. Further, plural lateral grooves 21 that extend in the tire width direction are formed in a central land portion 20 that is demarcated between the central narrow groove 13 and the central circumferential groove 17 and that extends in the tire circumferential direction. Due thereto, the central narrow groove 13 and the central circumferential grooves 16, 17 are communicated with one another by the lateral grooves 19, 21. Here, the aforementioned tire width direction includes the direction orthogonal to the tire equator S, and includes directions that are inclined by angles of less than 45° with respect to that orthogonal direction.

These lateral grooves 19, 21 are disposed so as to be spaced apart at a uniform distance in the tire circumferential direction. The tire width direction inner ends of the lateral grooves 19 open at the largest amplitude portions that veer toward the central circumferential groove 16 side of the central narrow groove 13. Further, the tire width direction outer ends of the lateral grooves 19 open at the largest amplitude portions that veer toward the central narrow groove 13 side of the central circumferential groove 16. On the other hand, the tire width direction inner ends of the lateral grooves 21 open at the largest amplitude portions that veer toward the central circumferential groove 17 side of the central narrow groove 13. Further, the tire width direction outer ends of the lateral grooves 21 open at the largest amplitude portions that veer toward the central narrow groove 13 side of the central circumferential groove 17. If, in this way, the one central narrow groove 13 is formed in the tread 12, and the two central circumferential grooves 16, 17 are formed at both the tire width direction outer sides of the central narrow groove 13, and, on the other hand, the plural lateral grooves 19 that communicate the central narrow groove 13 and the central circumferential groove 16 and the plural lateral grooves 21 that communicate the central narrow groove 13 and the central circumferential groove 17 are formed in the central land portions 18, 20 that are between the central narrow groove 13 and the central circumferential grooves 16, 17 respectively, numerous block land portions 22, 23 that are spaced apart in the tire circumferential direction are respectively demarcated in the central land portions 18, 20. Here, the above-described central narrow groove 13 and central circumferential grooves 16, 17 are bent in zigzag shapes, and the lateral grooves 19, 21 are both inclined in the same directions and at the same angles with respect to the tire width direction. Therefore, the block land portions 22, 23 assume deformed hexagonal shapes, and side walls 19a, 21a of the lateral grooves 19, 21 structure the tire circumferential direction side walls of these block land portions 22, 23.

The above-described numerous block land portions 22 that assume hexagonal shapes, on the whole, structure a block land portion row 24 that is sectioned and formed between the central narrow groove 13 and the central circumferential groove 16. Further, the block land portions 23 on the whole structure a block land portion row 25 that is sectioned and formed between the central narrow groove 13 and the central circumferential groove 17. Note that, in this embodiment, the numerous block land portions 22, 23 that assume hexagonal shapes are demarcated by forming the central circumferential grooves 16, 17 in zigzag shapes, but, in the present disclosure, the central circumferential grooves may be structured from grooves that extend in rectilinear forms along the tire equator S. In this case, the block land portions are pentagonal, and the block land portion rows are structured from the numerous pentagonal block land portions. Inner side cutouts 28, which extend rectilinearly toward outer-side side walls 22b in the tire width direction of the block land portions 22, are formed in the inner-side side walls 22a in the tire width direction, which are exposed to the central narrow groove 13, of the respective block land portions 22, at the tire circumferential central portions thereof, and here, in vicinities of the vertices where the inner-side side walls 22a intersect at obtuse angles, in order to improve the drainage characteristics while suppressing a deterioration in the wear resistance. Further, inner side cutouts 29, which extend rectilinearly toward outer-side side walls 23b in the tire width direction of the block land portions 23, are formed in inner-side side walls 23a in the tire width direction, which are exposed to the central narrow groove 13, of the respective block land portions 23, at the tire circumferential central portions thereof, and here, in vicinities of the vertices where the inner-side side walls 23a intersect at obtuse angles, in order to improve the drainage characteristics while suppressing a deterioration in the wear resistance.

Further, a decrease in the rigidity at the block land portions 22, 23 is suppressed due to these inner side cutouts 28, 29 ending midway along the block land portions 22, 23 without reaching the central circumferential grooves 16, 17 respectively. As a result, tire width direction distances L of the respective block land portions 22, 23 (the distance from the inner-side side wall 22a to the outer-side side wall 22b, and the distance from the inner-side side wall 23a to the outer-side side wall 23b, measured along a straight line that is orthogonal to the tire equator S) respectively are relatively small values at the positions of the inner side cutouts 28, 29. Note that, in the present disclosure, the shapes of these inner side cutouts 28, 29 may be curved or zigzagged, and not rectilinear. Further, the outer-side side walls 22b, 23b of the above-described block land portions 22, 23 that assume hexagonal shapes are structured from long side-wall portions 22c, 23c, whose circumferential direction lengths are long, and short side-wall portions 22d, 23d, having circumferential direction lengths that are shorter than those of the long side-wall portions 22c, 23c. The points of intersection between these long side-wall portions 22c, 23c and short side-wall portions 22d, 23d are one vertices Pa among the six vertices that the block land portions 22, 23 have.

Outer side circumferential grooves 32, 33 that extend continuously in the tire circumferential direction are formed further toward the tire width direction outer sides that the central circumferential grooves 16, 17, respectively. These outer side circumferential grooves 32, 33 are bent in zigzag shapes of the same wavelength. As a result, first outer side land portions 34 and first outer side land portions 36, which serve as outer side land portions and extend in the tire circumferential direction, are respectively provided further toward the tire width direction outer sides than the two central circumferential grooves 16, 17, and, in detail, between the central circumferential groove 16 and the outer side circumferential groove 32, and between the central circumferential groove 17 and the outer side circumferential groove 33. Plural lateral grooves 35, 37 that extend in the tire width direction are formed in the first outer side land portions 34, 36 respectively. As a result, the central circumferential groove 16 and the outer side circumferential groove 32 are communicated with one another by the lateral grooves 35. Further, the central circumferential groove 17 and the outer side circumferential groove 33 are communicated with one another by the lateral grooves 37. Further, the lateral grooves 35, 37 are spaced apart from one another at equal distances in the tire circumferential direction, and here, at the same pitch as the lateral grooves 19, 21. Due thereto, numerous first outer side blocks 38, 39 that are spaced apart at a uniform distance in the tire circumferential direction are demarcated in the first outer side land portions 34, 36 respectively, by the central circumferential grooves 16, 17, the outer side circumferential grooves 32, 33 and the lateral grooves 35, 37. These numerous first outer side blocks 38, 39 on the whole structure two first outer side block rows 40, 41 that are sectioned and formed between the central circumferential groove 16 and the outer side circumferential groove 32, and between the central circumferential groove 17 and the outer side circumferential groove 33, respectively.

Second outer side land portions 44, 45 that extend in the tire circumferential direction are respectively demarcated between the outer side circumferential grooves 32, 33 and the tread ends D, D. Plural lateral grooves 46, 47 that extend in the tire width direction are formed in the second outer side land portions 44, 45 respectively. The tire width direction inner ends of these lateral grooves 46, 47 communicate with the outer side circumferential grooves 32, 33, and the tire width direction outer ends thereof open at the tread ends D, D. Here, the lateral grooves 46, 47 are spaced apart from one another at a uniform distance in the tire circumferential direction, and here, at the same pitch as the lateral grooves 19, 21. As a result, numerous second outer side blocks 48, 49 that are spaced apart at a uniform distance in the tire circumferential direction are demarcated in the second outer side land portions 44, 45 respectively, by the outer side circumferential grooves 32, 33 and the lateral grooves 46, 47. The above-described numerous second outer side blocks 48, 49 on the whole structure two second outer side block rows 50, 51 that are sectioned and formed between the outer side circumferential groove 32 and the tread end D, and between the outer side circumferential groove 33 and the tread end D, respectively.

Here, plural outer side cutouts 54, 55, which respectively correspond one-to-one to the respective block land portions 22, 23, are formed so as to be a spaced part at a uniform distance in the tire circumferential direction, in the tire width direction inner-side side walls, which are exposed to the central circumferential grooves 16, 17, of the first outer side land portions 34, 36 that serve as the outer side land portions, and, in detail, in inner-side side walls 38a, 39a in the width direction of the first outer side blocks 38, 39. These outer side cutouts 54, 55 extend toward the tire width direction outer sides (the tread ends D), and end midway along the first outer side land portions 34, 36 (the first outer side blocks 38, 39) without reaching the outer side circumferential grooves 32, 33. Note that, in this embodiment, the outer side land portions are structured from the first outer side land portions 34, 36. However, in the present disclosure, the outer side land portions may be ribs that extend continuously in the circumferential direction with the lateral grooves being omitted, or, by omitting the outer side circumferential grooves, may be one rib that extends in the tire circumferential direction between the central circumferential groove and the tread end.

Further, in this embodiment, the outer side cutouts 54, 55 are provided at positions that are described hereinafter, in order to improve the on-snow performance without leading to a deterioration in the other tire performances at the above-described tire 11. Namely, as described above, the respective block land portions 22, 23 are hexagonal or pentagonal, and moreover, the side walls 19a, 21a of the lateral grooves 19, 21 that extend in the tire width direction structure both the tire circumferential direction side walls of the block land portions 22, 23. Therefore, the width direction distance L becomes continuously larger while heading toward the circumferential direction central portion. Here, in this embodiment, the inner side cutouts 28, 29, which extend toward the outer-side side walls 22b, 23b and end midway as described above, are respectively formed in the inner-side side walls 22a, 23a of the respective block land portions 22, 23 at the circumferential direction central portions thereof. Therefore, at the regions where these inner side cutouts 28, 29 are formed, the width direction distance L of the block land portions 22, 23 is a value that is very small. As a result, at the respective block land portions 22, 23, maximum position A where the width direction distance L is a maximum does not exist on the inner side cutouts 28, 29, and exists at at least either one of further toward tire circumferential direction one sides or tire circumferential direction another sides than the inner side cutouts 28, 29 (at one place or at two places). Here, the maximum width position that is at the tire circumferential direction one side where the tire circumferential direction length is long, i.e., at the long side-wall portions 22c, 23c, is the maximum position A. As a result, the width direction distance L (the block width) of the block land portion 22, 23 continuously decreases from this maximum position A while heading toward both the tire circumferential direction ends of the block land portion 22, 23.

Figure 3:
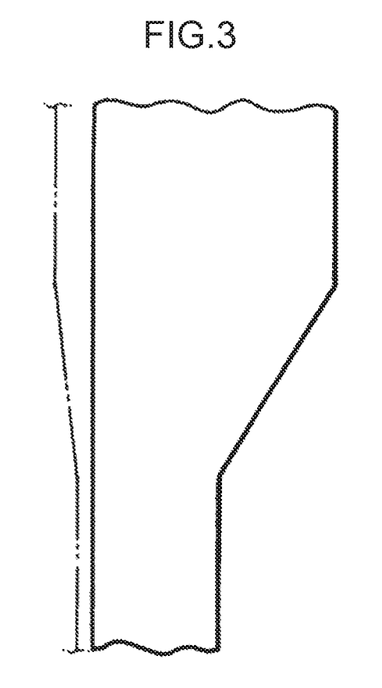
FIG. 3 is a plan view for explaining the deformed state of a block that does not have a vertex at the left side.

Further, when the block land portions 22, 23 intrude into the ground-contacting region due to traveling of the tire 11, the block land portions 22, 23 receive the applied load and are crushed in the tire radial direction. At this time, because the rubber is incompressible, the side walls of the block land portions 22, 23 deform so as to expand in all directions including toward the tire width direction outer side (the first outer side land portions 34, 36). Here, because deformation toward the tire width direction outer side is important as will be described later, with regard to the expansion deformation of the block land portions 22, 23, only deformation toward the tire width direction outer sides is explained. First is considered how the outer-side side walls 22b, 23b deform so as to expand toward the first outer side blocks 38, 39 if the effects of the vertices at the tire width direction outer side portions of the block land portions 22, 23 are ignored (if it is assumed that these vertices do not exist). In this case, as shown in the schematic drawing of FIG. 3, the greater the width direction distance, the greater the amount of the expansion deformation, as shown by the imaginary line. Therefore, the amount of expansion of the block land portion 22, 23 (the outer-side side wall 22b, 23b) toward the tire width direction outer side is greatest at the maximum position A where the width direction distance L (the block width) of the block land portion 22, 23 is largest, and continuously decreases while heading from the maximum position A toward both the tire circumferential direction ends, i.e., while moving away from the maximum position A in the tire circumferential direction such that the width direction distance L becomes smaller. As a result, due to the tire 11 traveling on a road surface that is covered by some accumulated snow, the snow that is pushed into the central circumferential grooves 16, 17 of the tire 11 is pushed out toward the first outer side land portions 34, 36 by the above-described expansion deformation of the outer-side side walls 22b, 23b toward the tire width direction outer sides. This pushed out amount is greatest at the maximum position A, and continuously decreases while moving away from the maximum position A.

Figure 4:
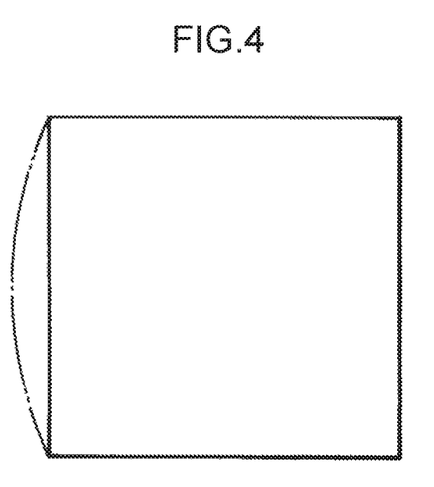
FIG. 4 is a plan view for explaining the deformed state of a rectangular block that has a vertex at the left side.

On the other hand, consideration is given as to how the outer-side side walls 22b, 23b deform so as to expand toward the first outer side blocks 38, 39 if the effects of the width direction distance L (the block width) of the block land portion 22, 23 are ignored (if it is assumed that the width direction distance is uniform). In this case, as shown in the schematic drawing of FIG. 4, the greater the distance from the vertex of the outer-side side wall, the more the amount of expansion deformation increases as shown by the imaginary line. Therefore, the amount of expansion deformation toward the tire width direction outer side of the block land portion 22, 23 (the outer-side side wall 22b, 23b) increases while moving away from both of the two places that are the vertex Pa and vertex Pb, and becomes greatest at intermediate point B that is the furthest apart. In other words, the amount of expansion deformation is substantially zero at the two places that are the vertex Pa and the vertex Pb at the tire width direction outer side portions of the block land portions 22, 23, and, on the other hand, while moving away in the tire circumferential direction from the vertex Pa and the vertex Pb, the amount of expansion deformation increases, and the amount of expansion deformation is greatest at the intermediate point B between the vertex Pa and the vertex Pb that are two places adjacent to one another.

Here, in this embodiment, the maximum width position, which is positioned further toward a tire circumferential direction one side than the inner side cutout 28, 29, is used as the maximum position A as described above. Therefore, the vertex Pb is the point of intersection between the long side-wall portion 22c, 23c and the tire circumferential direction one-side side wall of the block land portion 22, 23. As a result, the tire circumferential direction side at which the intermediate point B is positioned is the same side as that of the maximum position A, i.e., the intermediate point B and the maximum position A are positioned further toward a tire circumferential direction one side than the inner side cutout 28, 29. Note that, in the present disclosure, the maximum width position, which is positioned further toward a tire circumferential direction another side than the inner side cutout 28, 29, can also be employed as the maximum position A. However, in this case, the vertex Pb becomes the point of intersection between the short side-wall portion 22d, 23d and the tire circumferential direction another-side side wall of the block land portion 22, 23. For this reason, due to the tire 11 traveling on a road surface that is covered by some accumulated snow, the snow that is pushed into the central circumferential grooves 16, 17 of the tire 11 is pushed out toward the first outer side land portions 34, 36 by the above-described expansion deformation of the outer-side side walls 22b, 23b toward the tire width direction outer sides. However, the pushed out amount is a maximum at the intermediate point B, and continuously decreases while moving away from the intermediate point B.

Further, the amount of expansion deformation of the block land portion 22, 23 toward the tire width direction outer side is the combined amount of the above-described two types of expansion deformation amounts. Both of these two types of expansion deformation amounts gradually decrease while moving away from the maximum position A and the intermediate point B, as described above. Therefore, the combined amount at region G that is between the maximum position A and the intermediate point B is greater than the combined amount at regions H that are further toward both the tire circumferential direction sides than the region G. For this reason, in this embodiment, the plural outer side cutouts 54, 55 described above are formed in the first outer side land portions 34, 36 (the first outer side blocks 38, 39), and, moreover, at least portions of tire width direction inner side openings 54a, 55a of the outer side cutouts 54, 55 are positioned in the region G that is between the maximum position A and the intermediate point B at the corresponding block land portion 22, 23.

Due thereto, due to the snow that is pushed into the central circumferential grooves 16, 17 being reliably pushed into the outer side cutouts 54, 55 by the expansion deformation of the block land portions 22, 23, the density of the snow within the outer side cutouts 54, 55 is increased, and columns of snow (snow columns) that are packed into the outer side cutouts 54, 55 are formed. Moreover, when within the ground-contact region, the first outer side land portions 34, 36 (the first outer side blocks 38, 39) also are crushed in the radial direction, but, at this time, the facing side walls of the outer side cutouts 54, 55 deform so as to expand and pack-in even more the snow that has penetrated into the outer side cutouts 54, 55, and therefore, the strength of these snow columns increases. Further, these snow columns are sheared at the time when the outer side cutouts 54, 55 leave the ground-contact region (at the time of kick-out), but the shearing resistance at this time (the reaction force of the shearing force applied to the snow column) acts on the tire 11 as a large gripping force, and the on-snow performance of the tire 11 can easily be improved. Here, the greater the amount of overlap between the region G and the tire width direction inner side opening 54a, 55a of the outer side cutout 54, 55, the more the on-snow performance can be improved. Accordingly, this amount of overlap may be made to be large, within a range of not bringing about a deterioration in the other tire performances. Here, due to the side walls of the central narrow groove 13 (the inner-side side walls 22a, 23a of the block land portions 22, 23) contacting one another within the ground-contact region, the above-described expansion deformation of the block land portions 22, 23 (the outer-side side walls 22b, 23b) toward the tire width direction outer sides (into the central circumferential grooves 16, 17) is limited, and therefore becomes a large value. As a result, even more of the snow, which has been pushed into the central circumferential grooves 16, 17, is pushed out toward the first outer side land portions 34, 36 by the expansion deformation of the block land portions 22, 23, and the above-described on-snow performance is greatly improved.

When the respective block land portions 22, 23 are hexagonal, as described above, if one of the two vertices P, and here, the vertex Pa, is structured from the point of intersection between the long side-wall portion 22c, 23c and the short side-wall portion 22d, 23d, and, on the other hand, the other vertex P, and here, the vertex Pb, is structured from the point of intersection of the long side-wall portion 22c, 23c and the tire circumferential direction one-side side wall of the block land portion 22, 23, the distance between the vertex Pa and the vertex Pb is long, and the amount of expansion of the outer-side side wall 22b, 23b at the intermediate point B is large. As a result, snow can be strongly pushed into the outer side cutouts 54, 55, and highly-dense snow columns can be formed. Note that, in this embodiment, as described above, the inner side cutouts 28, 29 are formed at the inner-side side walls 22a, 23a of the respective block land portions 22, 23, at the circumferential direction central portions thereof (here, on the vertices P). However, in the present disclosure, these inner side cutouts may be omitted. At this time, if the block land portions are hexagonal, the maximum position A exists at one place or two places on the vertices, and, when existing at two places, it suffices for either one to be the maximum position A. Further, in a case in which the maximum position A exists at two places as described above, and the maximum position A is positioned on the vertex at the inner-side side wall of the block land portion, the region G and the maximum position A are positioned further toward a circumferential direction same one side (the circumferential direction one side or the circumferential direction another side) than the vertex that is at the outer-side side wall of the block land portion. Further, if the block land portions are pentagonal, the maximum position A is at only one place, i.e., is on the vertex of the inner-side side wall of the block land portion.

Further, in this embodiment, the two regions, which are positioned at both the tire circumferential direction sides of the outer side cutouts 54, 55 at the inner-side side walls 38a, 39a in the tire width direction of the first outer side land portions 34, 36 (the first outer side blocks 38, 39), are made to intersect at intersection angle J that is greater than 90° and less than 180°, i.e., at an obtuse angle. By doing so, the snow, which has been pushed against the peripheries of the outer side cutouts 54, 55 due to the above-described expansion deformation can be accumulated in the outer side cutouts 54, 55 by the inner-side side walls 38a, 39a in the tire width direction of the first outer side land portions 34, 36 (the first outer side blocks 38, 39) that assume parabolic shapes. Due thereto, highly-dense snow columns can be formed easily. Further, length M of the outer side cutouts 54, 55 may be shorter than groove width N of the central circumferential grooves 16, 17. The reason for this is that the lengths of the outer side cutouts 54, 55 are relatively small values, and snow is reliably pushed into the entireties of these outer side cutouts 54, 55, and the strength of the snow columns themselves can be increased.

Moreover, in the present embodiment, groove width central line Q of the outer side cutouts 54, 55 intersects the outer-side side wall 22b, 23b of the corresponding block land portion 22, 23, and, here, the long side-wall portion 22c, 23c, at a right angle or at an angle that approximates a right angle. By doing so, the snow, which is pushed out by the expansion deformation of the block land portions 22, 23, is pushed into the outer side cutouts 54, 55 without waste, and strong snow columns can be formed reliably. Further, in order to form strong snow columns, the outer side cutouts 54, 55 may be extended in rectilinear shapes at a uniform width as in this embodiment. Note that the above-described hexagonal shape also includes shapes that have been changed slightly, for example, shapes in which a portion of the block land portion 22, 23 in a vicinity of the vertex Pa is removed substantially along the tire equator S as shown by the imaginary line in FIG. 2, in order to make the flow of water in the central circumferential grooves 16, 17 smooth and improve the drainage characteristics. In this case, vertex Pc is one of the adjacent vertices, and an intermediate position between the vertex Pc and the vertex Pb is the intermediate point B. Further, in this embodiment, the present disclosure is applied to a normal tire, but the present disclosure may be applied to winter tires such as studless tires, snow tires, and the like.

INDUSTRIAL APPLICABILITY

The present disclosure can be applied to the industrial field of tires in which block land portion rows, which are formed from numerous block land portions, are disposed at the tread central portion.

The disclosure of Japanese Patent Application No. 2017-200582 filed on Oct. 16, 2017 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A tire comprising: a central narrow groove that is formed in a tread central portion and extends in a tire circumferential direction while having a zigzag shape; and two central circumferential grooves that are respectively formed at both tire width direction outer sides of the central narrow groove and extend in the tire circumferential direction and have widths that are wider than the central narrow groove; and a plurality of lateral grooves that communicate the central narrow groove with the central circumferential grooves and extend in a tire width direction and are spaced apart in the tire circumferential direction; and two block land portion rows that are sectioned and formed between the central narrow groove and the central circumferential grooves respectively, by forming the central narrow groove, the two central circumferential grooves and the plurality of lateral grooves, and each block land portion row being structured from numerous pentagonal or hexagonal block land portions having tire circumferential direction side walls that are side walls of the lateral grooves, wherein:

a plurality of outer side cutouts, which respectively correspond to the block land portions and extend toward tire width direction outer sides and end midway along outer side land portions, are spaced apart in the tire circumferential direction in tire width direction inner-side side walls, which are exposed to the central circumferential grooves, of the outer side land portions that are provided further toward tire width direction outer sides than the two central circumferential grooves respectively, and at least portions of tire width direction inner side openings of the outer side cutouts are positioned between maximum position A, at which a tire width direction distance of a corresponding block land portion is a maximum, and an intermediate point B of two vertices that are adjacent at a tire width direction outer-side side wall of the block land portion, wherein, due to the central circumferential grooves being formed in zigzag shapes, the respective block land portions are hexagonal, and a tire width direction outer-side side wall of the block land portion is structured from a long side-wall portion and a short side-wall portion having a circumferential direction length that is shorter than the long side-wall portion, and one of the two vertices is structured from a point of intersection of the long side-wall portion and the short side-wall portion, and another of the two vertices is structured from a point of intersection of the long side-wall portion and a tire circumferential direction side wall of the block land portion, and the intermediate point B is located on the long side-wall portion.

2. The tire of claim 1, wherein regions, which are positioned at both tire circumferential direction sides of the outer side cutout at a tire width direction inner-side side wall of the outer side land portion, intersect at an obtuse angle.

3. The tire of claim 1, wherein a length of the outer side cutout is shorter than a width of the central circumferential grooves.

4. The tire of claim 1, wherein a groove width central line of the outer side cutout intersects a tire width direction outer-side side wall of the block land portion at a right angle or at an angle that approximates a right angle.

5. The tire of claim 1, wherein regions, which are positioned at both tire circumferential direction sides of the outer side cutout at a tire width direction inner-side side wall of the outer side land portion, intersect at an obtuse angle; and a length of the outer side cutout is shorter than a width of the central circumferential grooves.

6. The tire of claim 1, wherein regions, which are positioned at both tire circumferential direction sides of the outer side cutout at a tire width direction inner-side side wall of the outer side land portion, intersect at an obtuse angle; and a groove width central line of the outer side cutout intersects a tire width direction outer-side side wall of the block land portion at a right angle or at an angle that approximates a right angle.

7. The tire of claim 1, wherein a length of the outer side cutout is shorter than a width of the central circumferential grooves; and a groove width central line of the outer side cutout intersects a tire width direction outer-side side wall of the block land portion at a right angle or at an angle that approximates a right angle.

8. The tire of claim 1, wherein regions, which are positioned at both tire circumferential direction sides of the outer side cutout at a tire width direction inner-side side wall of the outer side land portion, intersect at an obtuse angle;

a length of the outer side cutout is shorter than a width of the central circumferential grooves; and a groove width central line of the outer side cutout intersects a tire width direction outer-side side wall of the block land portion at a right angle or at an angle that approximates a right angle.

* * * * *